April 14, 1936.  E. McCORMICK  2,037,083
MAGNETO MOUNTING
Filed Oct. 5, 1934
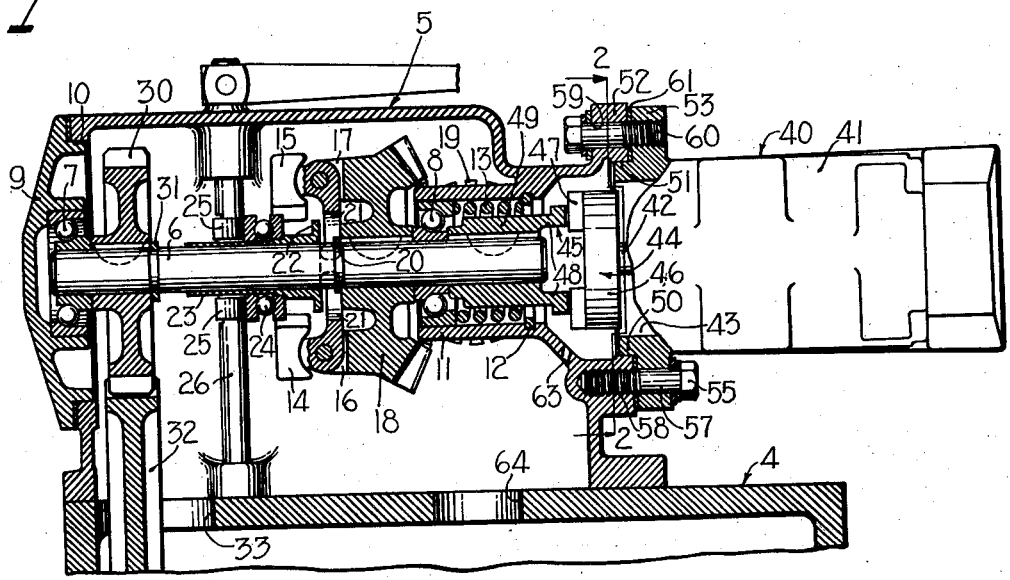
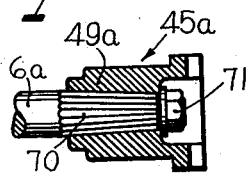
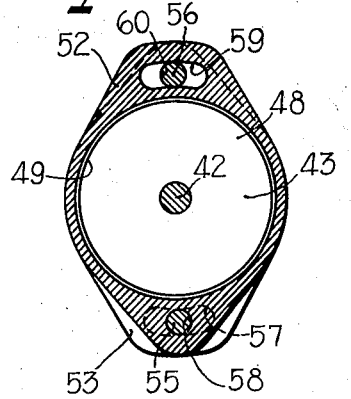
INVENTOR
Elmer McCormick.
BY Brown, Jackson, Boettcher & Dienner
ATTORNEYS.

Patented Apr. 14, 1936

2,037,083

UNITED STATES PATENT OFFICE 2,037,083

MAGNETO MOUNTING

Elmer McCormick, Waterloo, Iowa, assignor to John Deere Tractor Company, Waterloo, Iowa, a corporation of Iowa Application October 5, 1934, Serial No. 746,982

11 Claims. (Cl. 123—149)

The present invention relates generally to tractors and more particularly to certain new and useful improvements in magneto mountings for tractor motors and other types of engines.

Heretofore it has been customary to mount magnetos by means of a base provided on the magneto housing, and to drive the magneto by means of a shaft extending to the outside of the magneto housing coupled to a shaft of the motor, usually the governor shaft extending to the exterior of the governor housing. In this type of mounting, since both the governor drive shaft and the magneto drive shaft extend to the exterior of their respective housings, it is necessary to provide packings for these shafts to seal the openings through which the shafts extend against the leakage of oil from the housings and against the entrance of dust into the housings. As no packing provides an absolutely tight seal, an annoying tendency for lubricant to leak at these two points is frequently experienced in tractors and other machines in which this type of magneto mounting occurs.

It is one object, therefore, of the present invention to eliminate these points for the entrance of dust and the leakage of lubricant by providing mounting means for the magneto which is carried directly on the motor housing itself, with the interior of the magneto housing communicating with the interior of the motor housing and with suitable gasket means disposed between the two housings which can be secured together in leak tight relation and maintained in that condition since the necessity for packing or otherwise sealing movable parts is entirely absent. A further object of the present invention in this connection is to provide such a housing-to-housing mounting with suitable means providing for an angular adjustment of the magneto housing relative to the motor housing for the purpose of adjusting the timing of the magneto, and by virtue of this arrangement a magneto can be used which need not be equipped with a spark retarder, since any necessary adjustment of the timing can be attained by rotating the magneto housing relative to the motor housing. A still further object of the present invention in this connection is the provision of suitable bolt means and slots providing for not only adjusting the timing position of the magneto, but, in addition, securing such adjustment by merely loosening the means which clamps the two housings together, thereby eliminating any necessity for withdrawing the securing means entirely.

An additional object of the present invention which is of particular importance in connection with tractor motors and similar engines is the provision of a magneto housing which is adapted to be secured directly to the housing of the governor mechanism and is, by the act of attaching the magneto housing, adapted to be driven from the same shaft or other means which drives the governor mechanism. Where such mechanism takes the form of a driving shaft, it is a further object of the present invention to provide suitable cooperating surfaces on the two housings, so that when they are brought and secured together, the driving shaft and the magneto shaft are properly aligned and can be operatively connected together by suitable companion coupling members carried on the adjacent ends of the shafts. It is also another object of the present invention in this connection to provide such a mounting for the magneto housing that the driving and driven shafts of the combined units are accurately disposed and maintained in the proper position, thereby eliminating any necessity for special couplings to accommodate possible misalignment of the two shafts. A further object of the present invention to provide such a new and improved mounting, wherein the magneto housing is bolted directly to the motor or governor housing, in which it is a simple matter to machine the inner periphery of the opening in the governor housing and the outer diameter of the cylindrical portion of the magneto housing, as well as the surfaces on the clamping flanges on the magneto housing and the governor housing to align the two shafts accurately, so that simple interlocking couplings fixed to the respective shafts may be used.

It is also an object of the present invention to provide suitable means for supporting the driving shaft, which actuates the magneto shaft, and to take care of any excess lubricant which may find its way from the motor or governor housing into the magneto housing, or vice versa.

A still further object of the present invention is the provision of means for driving the magneto shaft from a motor driven gear member and to provide for the removal of such means so that in the event the magneto requires an extent of retiming adjustment in excess of the adjustment afforded by shifting the magneto housing relative to the governor or motor housing, it is a simple matter to remove, at least partially, the driving connections between the motor driven gear member and the magneto drive shaft and shift these connections, as by meshing gears in different relative positions.

These and other objects and advantages of the present invention will be apparent to those skilled in the art after a consideration of the following detailed description of the preferred embodiment, taken in conjunction with the accompanying drawing in which such embodiment has been illustrated.

In the drawing:—

Figure 1 is a transverse vertical section taken through a tractor motor and showing a portion of the top of the motor block and the governor driving mechanism connected to drive an attached magneto;

Figure 2 is a section taken along the line 2—2 of Figure 1; and

Figure 3 illustrates a modified form for securing an adjustment for retiming the magneto.

Referring now to the drawing, a portion of the motor block is shown at 4 on the top of which the governor or motor housing 5 is bolted or otherwise secured. In some cases, the governor or motor housing 5 may be an integral part of the motor block or crank case housing. Tractor motors are usually provided with governor mechanism and since the motor housing for such governor mechanism affords a convenient mounting for the magneto, I have therefore illustrated the principles of the present invention as embodied in a motor having such governor mechanism and a housing therefor, but it is to be understood that the housing 5 may be some other unit of the motor. As illustrated, the motor or governor housing 5 has a governor drive shaft 6 journaled therein on bearing means 7 and 8 disposed adjacent opposite ends of the governor driving shaft 6. The outer raceway of the bearing means 7 is carried by a bearing plate 9 removably fixed over an opening 10 in one side or end of the governor or motor housing 5. The outer raceway of the other bearing means 8 is slidingly mounted in the inner end of a bearing sleeve 11 which extends into and is preferably but not necessarily formed integral with the interior of the motor or governor housing 5. A snap ring 12 is disposed adjacent the outer end of the sleeve 11, and between the outer raceway of the bearing means 8 and the snap ring 12 there is disposed an expansion spring 13 which exerts a force holding the bearing means 7 and 8 in operative position, meanwhile providing for expansion of the governor shaft 6.

The governor mechanism includes a pair of weights 14 and 15 pivotally connected to a pair of axially extending arms 16 and 17 which are provided on a bevel gear member 18 which is keyed to the governor shaft 6. The bevel gear member, as such, does not form a part of the present invention except in so far as providing for the pivotal support of the governor weights 14 and 15, but it is to be noted that the gear member 18 as illustrated is adapted to mesh with another gear member 19 for the purpose of driving the fan (not shown) of the tractor motor. The hub of the member 18 is disposed between a snap ring 20 and the inner raceway of the bearing means 8. The governor weights 14 and 15 are provided with inwardly extending arms 21 which bear against the flanged end 22 of a sleeve 23 which is slidably disposed on the driving shaft 6. The sliding movements of the sleeve 23, occasioned by the radial movements of the governor weights 14 and 15, are transmitted through a ball thrust bearing 24 to a forked arm 25 fixed to a vertical rock shaft 26, the axis of which is spaced from the axis of the governor shaft 6. The rock shaft 26 is suitably connected to the throttle or to some other control of the motor, whereby the movements thereof govern the speed and operation of the engine.

For the purpose of driving the shaft 6, the outer end thereof is provided with a pinion 30 keyed thereto and disposed between a snap ring 31 and the inner raceway of the bearing means 7. The pinion 30 meshes with a gear 32 which is a motor driven member extending upwardly through an opening 33 in the motor block 4 into the governor or motor housing 5 and is operatively associated with or forms a part of the transmission mechanism of the tractor motor.

A magneto is indicated in its entirety by the reference numeral 40 and comprises a magneto housing 41 in which the magneto parts are enclosed, the drive shaft therefor being shown at 42. The magneto drive shaft extends through an opening 43 in the magneto housing 41 and is provided with a driving coupling member 44 on its outer end, which is adapted to have driving engagement with a companion driving coupling member 45. The first coupling member 44 comprises a disc 46 having two axially extending lugs 47 which are adapted to be engaged by two axially extending arms 48 carried by the companion coupling member 45, the latter including a sleeve 49 which forms a part thereof, being keyed to the governor shaft 6 and carrying the arms 48. Preferably, the arms 48 are slotted to receive the lugs 47, and through this connection the drive shaft 42 of the magneto is driven from the governor drive shaft 6.

For the purpose of insuring that the shafts 6 and 42 shall be in axial alignment when the magneto housing 41 is secured, as will be explained later, to the governor or motor housing 5, the magneto housing 41 adjacent the opening 43 is formed with a cylindrical portion 50, the axis of which coincides with the axis of the magneto drive shaft 42. The cylindrical portion 50 fits into a circular opening 51 formed in the governor housing 5, this opening being concentric with the axis of the governor driving shaft 6. The cylindrical portion 50 and the opening 51 are machined to an accurate fit in order that the shafts 6 and 42 shall be in accurate alignment.

A flange 52 is provided on the governor or motor housing 5 adjacent the opening 51 therein, and a companion flange 53 extends radially from the inner end of the magneto housing 41 adjacent the opening 43 therein. The two flanges are adapted to be securely clamped together by means of two bolts 55 and 56. The bolt 55 extends through a slot 57 formed in the flange 53 and is threaded into a threaded boring 58 formed in the flange 52. The other bolt 56 extends through a slot 59 in the flange 52 and is threaded into a threaded boring 60 formed in the upper portion of the flange 53. If desired, one flange may carry both of the slots. A gasket 61 is disposed between the clamping surfaces, which are disposed in planes at right angles to the axis of the aligned shafts 6 and 42, whereby the two housings 5 and 41 are clamped together in fluid tight and dust tight engagement. Lubricant flowing along the sleeve 11 or escaping from the magneto housing 40, flows downwardly through a small boring 63 in the lower portion of the sleeve 11 and through an opening 64 in the top of the motor block 4. It will thus be seen that the governor operating parts, as well as the magneto operating parts are properly lubricated, but, by virtue of the secure clamping engagement of the flanges 52 and 53, there is no likelihood of any lubricant leaking out of the interconnected housings.

The purpose of providing the slots 57 and 59 is to adjust the angular position of the magneto housing 41 relative to the governor or motor housing 5, thereby providing for adjusting the timing of the magneto 40. This adjustment is made by loosening the bolts 55 and 56, rotating the housing 41 to the required position, and again tightening the bolts. It is to be noted that the bolts 55 and 56 need not be entirely removed, but may be merely loosened, to provide for shifting the position of the magneto housing. The slots 57 and 59 are of a length to provide approximately a 20 degree adjustment.

The opening 10 in the motor housing 5 opposite the opening 51 therein is made sufficiently large to permit the driving shaft 6 with the pinion 30 keyed thereto, to be withdrawn through the opening 10 upon the removal of the bearing plate or cap 9. This permits moving the shaft 6 axially sufficiently so that the teeth of the pinion 30 will clear the teeth of the motor driven gear member 32, after which the governor shaft 6 may be rotated one or more tooth spaces, to obtain additional adjustment of the timing of the magneto 40, and then restored to operative position by replacing the bearing cap 9. This axial movement of the shaft 6 does not interfere with the governor mechanism itself.

Another manner in which the coupling member may be connected to the end of the governor to provide a timing adjustment in addition to the slotted flange connection described above is shown in Figure 3. In this form the governor driving shaft, indicated by the reference numeral 6a, is provided with a series of tapered splines 70 which are engaged by similarly shaped internal splines on the sleeve 49a of the driving coupling 45a. The coupling 45a is held on the shaft 6a in any position of adjustment by a nut 71 on the end of the shaft, which is threaded for the purpose of receiving the nut 71. In this construction, to obtain a timing adjustment beyond that provided for by the slots 57 and 59, it is merely necessary to remove the magneto housing and then remove the sleeve 49a and reposition it in a different angular position with respect to the shaft 6a. In this form the bearing cap 9 need not be removed.

While I have shown and described above the preferred construction in which the principles of the present invention have been embodied, it is to be understood that my invention is not to be limited to the specific details shown and described, but that, in fact, widely different means may be employed in the practice of the broader aspects of my invention.

What I claim, therefore, and desire to secure by Letters Patent is:—

1. In combination, a housing having a rotatable shaft therein, lubricated means operatively connected with said shaft, a magneto comprising a housing adjustably secured to said first housing with the interior of one communicating with the interior of the other to provide for movement of lubricant from one to the other, cooperating flanges carried by said housings, a magneto drive shaft journaled for rotation and with said flanges in engagement, means including bolt means carried by one of said flanges and slot means in the other flange for receiving said bolt means for adjustably connecting said housings together in lubricant tight relation, said bolt and slot means providing for adjusting the timing of the magneto by shifting one housing with respect to the other, and coupling means on the adjacent ends of said shafts and arranged to be interlocked when the magneto housing is brought into position with one of said flanges against the other.

2. The combination with a housing having a drive shaft journaled therein and having a circular opening therein disposed concentric with respect to the axis of said shaft and having a radially outwardly extending clamping flange adjacent the outer margin of said opening having a clamping surface disposed in a plane perpendicular to the axis of said shaft, said shaft having a coupling member on its end adjacent said opening, of a magneto comprising a housing, a magneto drive shaft journaled in said housing, said housing having an opening through which one end of said second shaft extends and by which the interior of the magneto housing is in communication with the interior of said first housing to provide for the movement of lubricant therebetween and the opening in said magneto housing having a cylindrical portion in axial alignment with said second shaft and of substantially the same outer diameter as the inner diameter of said circular opening, said cylindrical portion being disposed in said circular opening and aligning said second shaft with said first shaft, said second housing also having a clamping flange adjacent the inner end of said cylindrical portion having a clamping surface disposed in a plane perpendicular to the axis of said second shaft, and means for clamping said flanges together in fluid-tight engagement, said second shaft having a coupling on the end adjacent said cylindrical portion interlocking with said first coupling, said clamping means providing for angular adjustment of the second housing relative to the first housing whereby the timing of said magneto may be adjusted.

3. In combination, a motor housing, a magneto having a housing mounted on the motor housing and a magneto drive shaft journaled in the magneto housing, a motor driven gear member extending into said motor housing, means for driving said magneto shaft from said gear member including a shaft adapted to be operatively connected with the magneto and having a pinion thereon adapted to mesh with said motor driven gear member, and means for removably securing said last named shaft in place and providing for the disengagement of said pinion from said gear member to adjust the timing of the magneto.

4. In combination, a motor housing, a magneto having a housing mounted on the motor and a magneto drive shaft journaled in the magneto housing, a motor driven gear member extending into said motor housing, the latter having an opening at one side to receive the magneto drive shaft and an oppositely disposed opening in the side adjacent said gear member, a shaft arranged in said motor housing and disposed in axial alignment with said magneto drive shaft, bearing means in said motor housing for supporting the end of the shaft therein adjacent said first mentioned opening in the motor housing, a pinion carried on the other end of said last named shaft and arranged to mesh with said motor driven gear member, and a bearing cap having bearing means supporting the adjacent end of the shaft in said motor housing, said bearing cap being disposed in said second mentioned opening in the motor housing and providing for the removal of said shaft to permit the pinion to be meshed with said motor driven gear member at a different point for the purpose of timing said magneto.

5. In combination, a motor housing having an opening at one end and a bearing sleeve disposed adjacent said opening, a magneto having a housing mounted over said opening and a magneto drive shaft journaled in the magneto housing and extending into said opening, a motor driven gear member extending into said motor housing, a second opening in said motor housing disposed in axial alignment with said first opening, a shaft having one end journaled in said bearing sleeve in axial alignment with said magneto drive shaft, a pinion carried by the other end of said shaft and adapted to mesh with said motor driven gear member, said pinion being disposed adjacent the second opening in said motor housing and having a diameter smaller than said second opening, a bearing cap disposed in said second opening and provided with bearing means for supporting the adjacent end of said shaft, the latter being removable when said bearing cap is removed to permit a repositioning of said pinion with respect to said motor driven gear member, and a coupling connecting the opposite end of the shaft in said motor housing with the magneto drive shaft.

6. In combination, a motor housing having openings at opposite ends thereof, a motor driven gear member disposed in said housing adjacent one end thereof, a magneto having a housing mounted over the other opening in said motor housing and including a magneto drive shaft extending through said opening, a motor driven shaft journaled for rotation in said motor housing and having one end supported adjacent and in axial alignment with said magneto drive shaft, a pair of cooperating coupling members secured, respectively, to the adjacent ends of the motor driven shaft and the magneto drive shaft, a pinion carried at the other end of said motor driven shaft and adapted to mesh with said motor driven gear member, and a removable bearing cap having bearing means supporting the pinion end of said motor driven shaft and providing for the removal, at least partially, of said pinion and the motor driven shaft from said motor housing for the purpose of adjusting the position of the coupling member carried by the motor driven shaft relative to said motor driven gear member to adjust the timing of the magneto.

7. In combination, a motor housing having an opening therein adjacent one end, a bearing sleeve carried by said housing adjacent said opening and disposed substantially axially thereof, a magneto having a magneto housing secured over said opening and a magneto driving shaft extending into said opening in substantially axial alignment with said bearing sleeve, a shaft journaled in said motor housing and supported by said bearing sleeve in axial alignment with the magneto drive shaft, means connecting the adjacent ends of said shafts, said bearing sleeve being provided with a lubricant draining opening in the lower part thereof adjacent said opening, and means for clamping the magneto housing to said motor housing in fluid tight relation with the interior of said housings communicating with one another.

8. In combination, a motor housing having substantially axially aligned openings at opposite portions thereof, a magneto comprising a magneto housing mounted on one of the openings in said motor housing and including a magneto drive shaft having a releasable coupling member adapted to be disposed adjacent said opening, the interior of said magneto housing communicating with the interior of said motor housing through said opening, a shaft for driving the magneto shaft journaled in said motor housing, a companion releasable clutch member carried by the end of said shaft adjacent said one opening in the motor housing, a motor driven gear member extending into the motor housing, a pinion gear fixed to the other end of said driving shaft and having a diameter smaller than the other opening in said motor housing, thereby providing for the withdrawal of said pinion and the associated shaft, and a bearing cap member receiving the pinion end of said driving shaft and removably secured in said other opening in the motor housing, and means for releasably securing said companion clutch member in any one of a number of adjusted positions on said driving shaft, thereby providing for adjusting the timing of the magneto by shifting the position of said companion clutch member when the pinion and the shaft associated therewith have been removed from the motor housing.

9. In combination, a motor housing having an opening therein adjacent one end, a bearing sleeve carried by said housing adjacent said opening and disposed substantially axially thereof, a magneto having a magneto housing secured over said opening and a magneto driving shaft extending into said opening in substantially axial alignment with said bearing sleeve, a shaft journaled in said motor housing and supported by said bearing sleeve in axial alignment with the magneto drive shaft, a coupling member mounted on the end of said motor shaft and disposed between said bearing sleeve and the opening in the motor housing so as to be adjacent the latter, and a companion coupling member secured to the end of said magneto shaft extending into said opening and adapted to operatively engage said first coupling member when said magneto housing is secured in position.

10. In combination, a motor housing having an opening therein adjacent one end, a bearing sleeve carried by said housing adjacent said opening and disposed substantially axially thereof, a magneto having a magneto housing secured over said opening and a magneto driving shaft extending into said opening in substantially axial alignment with said bearing sleeve, a shaft journaled in said motor housing and supported by said bearing sleeve in axial alignment with the magneto drive shaft, a coupling member having a diameter less than the internal diameter of said bearing sleeve and mounted on the end of the motor shaft in a position between said bearing sleeve and the opening in the motor housing, and a companion coupling member secured to the end of said magneto shaft extending into said opening and adapted to operatively engage said first coupling member and to be disposed within said motor housing when the magneto housing is secured in position.

11. In combination, a motor housing having substantially axially aligned openings at opposite portions thereof, a magneto comprising a magneto housing mounted on one of the openings in said motor housing and including a magneto drive shaft having a releasable coupling member adapted to be disposed adjacent said opening, the interior of said magneto housing communicating with the interior of said motor housings through said opening, a shaft for driving the magneto shaft journaled in said motor housing, a companion clutch member releasably carried by the end of said shaft adjacent said one opening in the motor housing, and means for releasably securing said companion clutch member in any one of a number of adjusted positions on said driving shaft, thereby providing for adjusting the timing of the magneto by shifting the position of said companion clutch member.

ELMER McCORMICK.